Jan. 12, 1932.  R. B. SIMNING  1,841,066

TRANSPORT

Filed Sept. 17, 1928  2 Sheets-Sheet 1

Inventor
Roy B. Simning.
By
Geo. Stevens
Attorney

Jan. 12, 1932. R. B. SIMNING 1,841,066
TRANSPORT
Filed Sept. 17, 1928 2 Sheets-Sheet 2
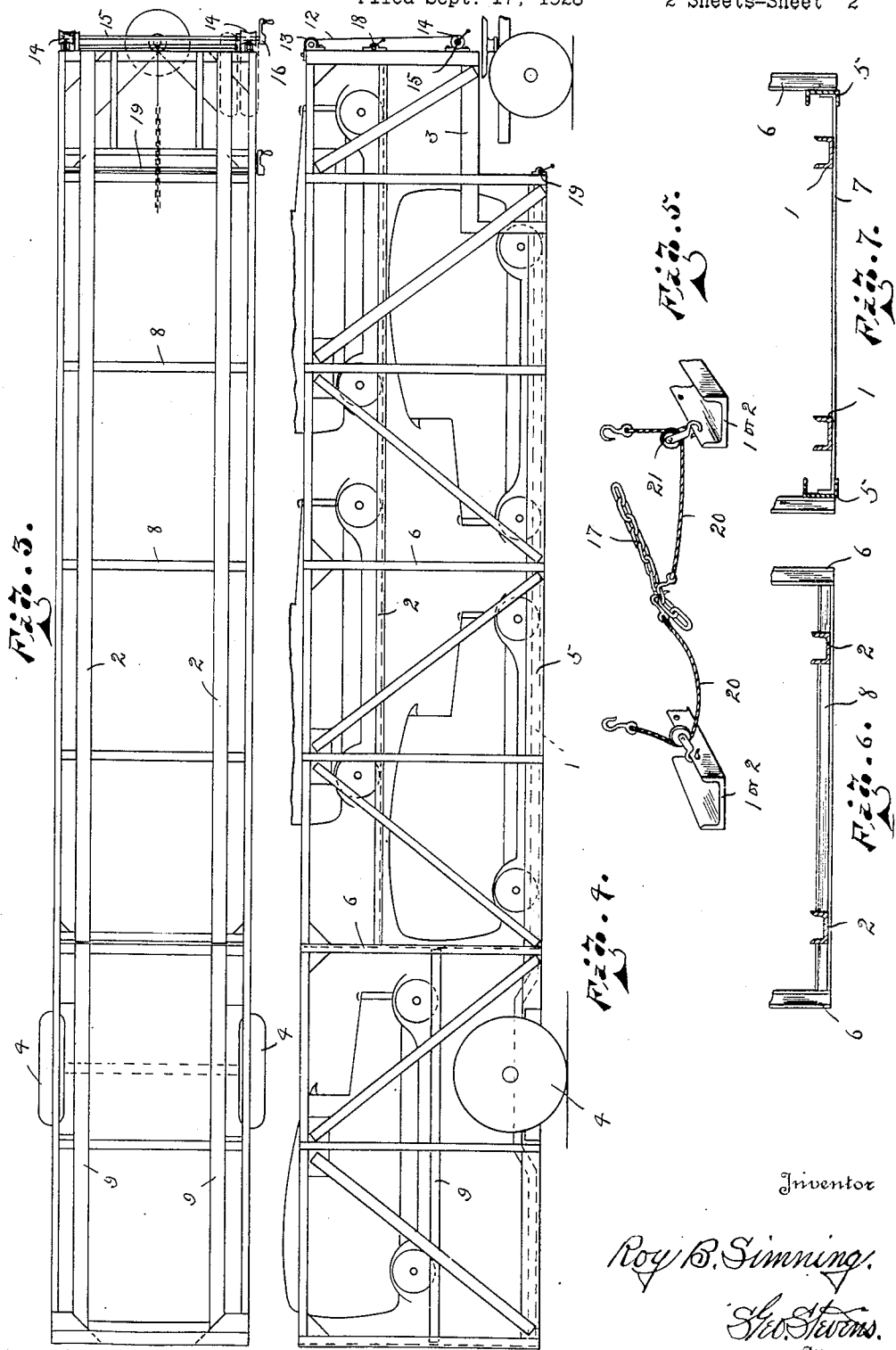

Patented Jan. 12, 1932

1,841,066

UNITED STATES PATENT OFFICE

ROY B. SIMNING, OF DULUTH, MINNESOTA, ASSIGNOR OF FIFTEEN PER CENT TO ROLLO G. LACY, OF DULUTH, MINNESOTA

TRANSPORT

Application filed September 17, 1928. Serial No. 306,426.

This invention relates to automobile transports and has special reference to a novel form of vehicle adapted for such purpose.

The principal object is to provide a simple and efficient transport having maximum carrying capacity and still being within the maximum dimensions allowed by State law for such transports.

Another object is that of providing novel means whereby the vehicle being transported may be made to occupy an abnormally small space.

Other objects and advantages of the invention will appear in the further description thereof.

Referring now to the accompanying drawings, forming part of this application, and wherein like reference characters indicate like parts:

Figure 3 is a reduced top plan view of a complete transport;

Figure 4 is a side elevation of Figure 3 illustrating the relative position of the vehicles being carried thereupon;

Figure 5 is an enlarged perspective schematic view of the means of stressing the vehicles for the purpose of occupying the abnormally small space;

Figure 6 is an enlarged transverse section of the upper deck of the transport; and Figure 7 is a similar view of the lower deck.

Figure 1:
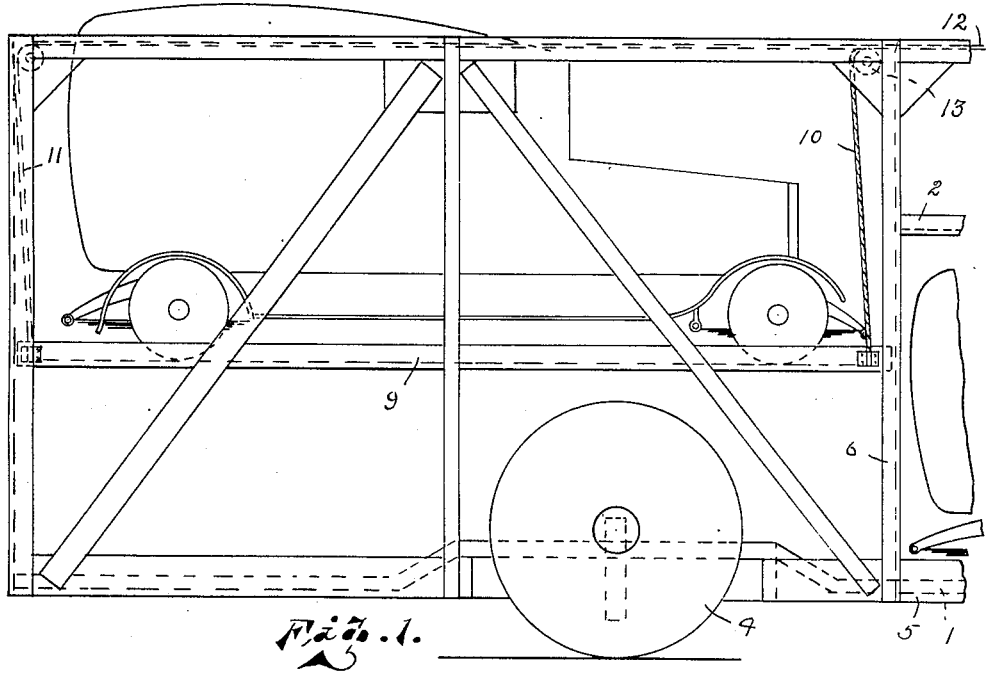
Figure 1 is a side elevation of the rearmost portion or section of one of the improved transports.
Figure 2:
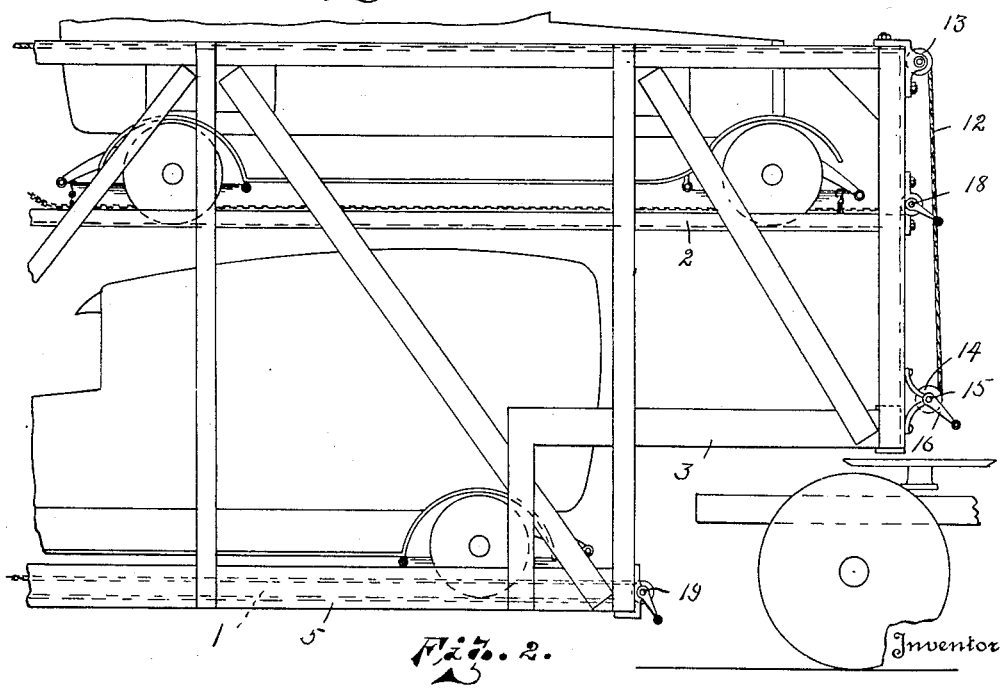
Figure 2 is a similar view of the foremost or front section of the transport.

The chassis frame of the transport is of angle and channel fabrication as is apparent from the drawings, and in which is mounted a lower deck or runway for the reception of automobiles, the channels for said runway being indicated at 1, and a similar upper deck or runway the channels of which are indicated at 2. This chassis frame has an overhanging or stepped forward portion indicated at 3 whereby it may be conveniently attached to a towing vehicle as a trailer, and which construction is common, though of course it may be provided with its own front wheels if desired. The rear wheels of the transport are indicated at 4, the axle of which is higher than the level of the lowermost deck or runway 1, they being so constructed as to bridge said axle in order that the lowermost tier of automobiles being carried may be as as low as possible and yet give the required ground clearance, or in other words the chassis frame in respect to the rear axle is underslung. Furthermore to this end I have devised a novel assemblage of chassis frame as clearly shown in the drawings, Figure 7, in that the stringers or side members 5 are of channel iron, facing inwardly, their backs being engaged by the upright members 6, and carrying therewithin the cross beams 7, of which there may be any desired number and directly upon which the runways 1 are mounted, thus bringing the tread of the automobiles being carried but slightly above a plane with the lowermost extremity of the chassis frame.

The upper deck or runways 2 are similarly disposed within the channel cross beams 8, so as to bring them as low as possible and yet clear the roof of the cars beneath. These uppermost runways extend forwardly of the lower runways and over the stepped portion of the chassis frame, but terminate rearwardly opposite the uprights or stancions 6 just forwardly of the rear wheels, from whence rearwardly they terminate in a vertically reciprocal section or elevator for the purpose of raising or lowering the cars transported upon the upper deck. This elevator section is indicated at 9 and may be of any desired reinforced structure but supported at its four corners by the ropes or lines indicated at 10 and 11, there being two of each which terminate in the horizontally disposed hoisting lines 12, one upon either side, that is to say, each hoisting line 12, just forwardly of the fixed sheave or pulley 13 above the forward corners of the elevator section 9, is spliced forming the short terminal 10 leading to one forward corner of the elevator and the longer terminal 11 leading to one rearmost corner of the elevator, so that when stress occurs upon the hoisting lines they will lift equally and simultaneously on all four corners of the elevator.

The forward ends of these hoisting lines lead to and over the sheaves 13, one just forwardly of each uppermost corner of the chassis frame, and thence downwardly to the drums 14 mounted upon the shaft 15 controlled by the winding crank 16, so that when the elevator 9 is lowered an automobile may be run up onto same and then raised bodily by the winding drum until the elevator section 9 is parallel with the runways 2, when the car may be advanced to its proper position thereupon in the transport, and the finally elevated car remaining on the elevator, is locked or secured thereto in any desired manner.

It is obvious that the after the upper deck is loaded, with cars, which in the embodiment here illustrated will accommodate three common automobiles, the lower deck may be loaded, each car for said lower deck having to surmount the elevated portion over the axle of the rear wheels, but during which time the elevator may be abnormally raised to permit of suitable clearance and subsequently lowered to proper position over the last loaded car.

Now the additional novel feature of the invention is made to function by there being provided for each deck a centrally disposed longitudinally operable draft chain 17, the uppermost one being mounted upon and controlled by the shaft 18 upon the foremost vertical frame of the chassis, and the lower deck one mounted upon and controlled by the shaft 19 in the stepped portion of the chassis frame. Each draft chain extends substantially the entire length of the transport except that the uppermost one must have a breakable connection of any desired form such as a ring and hook at the forward end of the elevator section, and directly beneath the termini of each carried vehicle are removably installed cross lines 20, they having a hook on either end, one for engagement with the chain 17 and the other for engagement with any desired part of the automobile directly thereover for example the ends of the springs. Each cross chain 20 passes through a corner sheave 21 hooked in any convenient manner as for example into a suitable hole in the innermost upstanding flange of the runways as clearly illustrated in Figure 5.

This installation of draft chains occurs only after the loading of the automobiles and when accomplished draft is applied by winding the respective shafts 18 and 19 when the downward pull of the cross chains 20 will uniformly depress each automobile attached thereto, thus lowering the height of same. This as is obvious is to provide proper clearance between the top of the lowermost cars and the upper deck, and to bring the top of the uppermost cars within the required limit of height for such a load.

It is to be understood that the cars upo the lower deck are temporarily depresse when placed thereupon, this being accom plished by compressing the springs in any de sired manner as by a crow bar or the like, an which does not form part of my present in vention.

Furthermore it will be obvious that th tying down or depressing mechanism em ployed during the transportation of the auto mobiles answers as an adequate anchorin means as well.

Having thus described my invention, wha I claim and desire to secure by Letters Pat ent, is:

1. An automobile transport comprising chassis having decks spaced apart a distanc less than the normal height of an automobile and means for transporting completely as sembled automobiles between said decks.

2. In a vehicle for transporting a plural ity of other vehicles, underslung channe irons forming the lowermost longitudina girders therefor, said underslung channe irons facing each other and carrying upo their lowermost flanges transverse members and runways for the vehicles to be trans ported upon said cross members.

3. In a vehicle for transporting a plural ity of other vehicles, underslung channel iron forming the lowermost longitudinal girder therefor, said underslung channel irons fac ing each other and carrying upon their lower most flanges transverse members, and run ways for the vehicles to be transported upor said cross members, said runways consisting of channel irons having their flanges upward ly turned.

4. The combination with a vehicle having spaced decks carrying automobile receiving tracks thereupon, of an elevator having tracks thereupon registrable with said deck tracks for selectively elevating automobiles to or from said decks.

5. The combination with an automobile transport having spaced automobile receiv ing decks thereupon, of an elevator selec tively registrable with either of said decks said elevator acting as a continuation of the uppermost of said decks during transporta tion.

6. An automobile transport comprising a chassis having a lower deck and an upper deck spaced apart a distance less than the normal height of an automobile, means for loading completely assembled automobiles on both decks, and means cooperatively uniting the automobiles with the transport for hold ing same in depressed position during trans portation.

In testimony whereof I affix my signature.

ROY B. SIMNING.